United States Patent
Thommana et al.

(10) Patent No.: US 11,617,218 B2
(45) Date of Patent: Mar. 28, 2023

(54) COMMUNICATION IN A DENIED ENVIRONMENT

(71) Applicant: Rockwell Collins, Inc., Cedar Rapids, IA (US)

(72) Inventors: John V. Thommana, Cedar Rapids, IA (US); Lizy Paul, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 35 days.

(21) Appl. No.: 17/171,324

(22) Filed: Feb. 9, 2021

(65) Prior Publication Data

US 2022/0256624 A1 Aug. 11, 2022

(51) Int. Cl.
*H04W 76/14* (2018.01)
*H04W 24/02* (2009.01)
*H04W 36/00* (2009.01)
*H04W 40/24* (2009.01)

(52) U.S. Cl.
CPC ........... *H04W 76/14* (2018.02); *H04W 24/02* (2013.01); *H04W 36/0083* (2013.01); *H04W 40/24* (2013.01)

(58) Field of Classification Search
CPC . H04W 76/14; H04W 24/02; H04W 36/0083; H04W 40/24
See application file for complete search history.

(56) References Cited

U.S. PATENT DOCUMENTS

| | | | |
|---|---|---|---|
| 10,499,307 B2 | 12/2019 | Tenny et al. | |
| 10,747,217 B1 | 8/2020 | Koenck et al. | |
| 10,784,910 B1 | 9/2020 | Chang et al. | |
| 11,196,157 B1 | 12/2021 | Bonney et al. | |
| 2008/0144815 A1 | 6/2008 | Richards et al. | |
| 2009/0310570 A1* | 12/2009 | Smith | H04W 76/14 370/335 |
| 2011/0009053 A1 | 1/2011 | Anglin, Jr. et al. | |
| 2014/0057566 A1 | 2/2014 | Watfa et al. | |

(Continued)

FOREIGN PATENT DOCUMENTS

| | | |
|---|---|---|
| CN | 106304053 A | 1/2017 |
| CN | 109831772 A | 5/2019 |

(Continued)

OTHER PUBLICATIONS

"Techniques for Tactical Radio Operations", Army Techniques Publication (ATP) 6-02.53.

(Continued)

*Primary Examiner* — Jae Y Lee
(74) *Attorney, Agent, or Firm* — Suiter Swantz pc llo

(57) ABSTRACT

Cellular communications, such as 5G cellular, may be a primary link between cell phones and a base station. Such cellular communications may be desirable, due to a high link rate. When the cellular communications are denied, a tactical waveform may be used to bridge communications between the cell phones and the base station. The tactical waveform may be transmitted between tactical radios coupled with the cell phones. The tactical radios may include an application layer coupled with an application layer of the cell phone, such that an application-specific integrated circuit (ASIC) of the cell phone may remain unchanged.

14 Claims, 13 Drawing Sheets

(56) References Cited

U.S. PATENT DOCUMENTS

| | | | |
|---|---|---|---|
| 2014/0233412 A1* | 8/2014 | Mishra | H04W 88/14 370/252 |
| 2018/0007497 A1 | 1/2018 | Ahmad et al. | |
| 2018/0027398 A1 | 1/2018 | Jung et al. | |
| 2018/0039287 A1 | 2/2018 | Shattil | |
| 2018/0295655 A1 | 10/2018 | Cavalcanti et al. | |
| 2019/0159037 A1 | 5/2019 | Byrne | |
| 2020/0045758 A1 | 2/2020 | Breuer et al. | |
| 2020/0178262 A1 | 6/2020 | Mishra et al. | |
| 2020/0314914 A1 | 10/2020 | Roy et al. | |
| 2020/0322895 A1 | 10/2020 | Hellhake et al. | |
| 2020/0373997 A1 | 11/2020 | Brown | |
| 2021/0297842 A1* | 9/2021 | Shrivastava | H04W 28/24 |

FOREIGN PATENT DOCUMENTS

| | | | |
|---|---|---|---|
| EP | 2499754 B1 | 10/2016 | |
| NZ | 720150 A | 6/2015 | |
| WO | 2013030825 A1 | 3/2013 | |

OTHER PUBLICATIONS

Extended Search Report in European Application No. 22155963.6 dated Jun. 27, 2022, 9 pages.

Extended Search Report in European Application No. 22155971.9 dated Jul. 2022, 10 pages.

Maxen, Fredrik, "A Comparative Analysis of Network Approaches for Tactical Wireless Communications, Validated by Joint Communication Simulation System (JCSS) Simulations: A Swedish Perspective", Navel Graduate School, Monterey, CA, Thesis, 2011, 110 pages.

Schlienz, J. et al., "Device to Device Communication in LTE", Rohde & Schwarz, Whitepaper D2D Communication—IMA264-0e, Downloaded Mar. 1, 2021, 36 pages.

Headquarters, Department of the Army, "Techniques for Tactical Radio Operations", Army Techniques Publication 6-02.53, Feb. 13, 2020, 218 pages.

Maxen, Fredrik, "A Comparative Analysis of Network Approaches for Tactical Wireless Communications, Validated by Joint Communication Simulation System (JCSS) Simulations: A Swedish Perspective", Thesis, Sep. 2011, Naval Postgraduate School, Monterey, CA, 110 pages.

Schlienz, J. et al., "Device to Device Communication in LTE", Rohde & Schwarz, Whitepaper D2D Communication, Downloaded Dec. 16, 2020, 36 pages.

Li et al., "Development and Testing of a Two-UAV Communication Relay System", Oct. 13, 2016, MDPI.

* cited by examiner

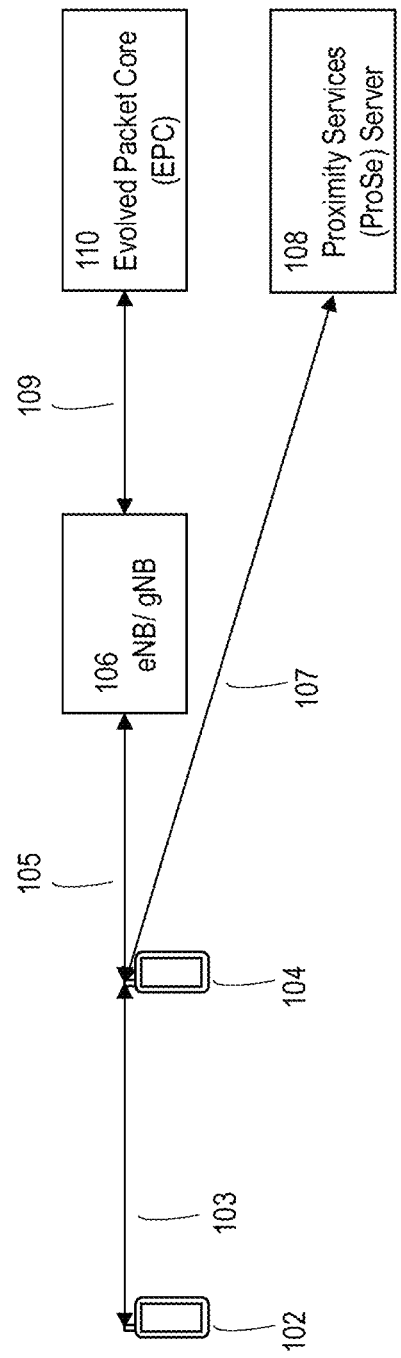
FIG. 1A —Prior Art—

COMMUNICATION IN A DENIED ENVIRONMENT

TECHNICAL FIELD

The present invention generally relates to communication systems, and more specifically to a denial resistant communication.

BACKGROUND

In 2015, the Long-Term Evolution Advanced (LTE-A) Release-12 was released. As part of this release a capability called "Device-to-Device (D2D)" communication was supported to enable public safety operations during emergencies. Since then, this capability has evolved and today it forms the basis for direct device to device communication for supporting V2X (Vehicle to Everything) communication in 5G. Such 5G communications are usable in permissive environments if cyber threats and all security capabilities provided by the 5G standard are enabled. The use of external end-to-end encryption and incorporation of zero trust networking is considered sufficient to operate in permissive environments. However, in a contested theater the 5G waveform has limited usability, because near peer enemies have a capability to deny the 5G waveform.

Therefore, it would be advantageous to provide a device, system, and method that cures the shortcomings described above.

SUMMARY

A system is disclosed, in accordance with one or more embodiments of the present disclosure. In one embodiment, the system includes a remote User Equipment (UE) configured to communicate by a cellular waveform. In another embodiment, the system includes a remote tactical radio configured to communicate by a tactical waveform, the remote tactical radio coupled with the remote UE by a first connectivity interface for transmitting information to and receiving the information from the remote UE. In another embodiment, the system includes a relay UE configured to communicate by the cellular waveform. In another embodiment, the system includes a relay tactical radio configured to communicate by the tactical waveform, the relay tactical radio coupled with the relay UE by a second connectivity interface for transmitting the information to and receiving the information from the relay UE. In another embodiment, the relay tactical radio is configured for transmitting the information to and receiving the information from the remote tactical radio by the tactical waveform.

A method of transmitting information is disclosed, in accordance with one or more embodiments of the present disclosure. By the method, a connection between a remote UE and a base station may be established. In one embodiment, the method includes checking, by a remote User Equipment (UE), for a direct cellular connectivity between the remote UE and a base station. In another embodiment, the method includes checking, by the remote UE, for a device-to-device (D2D) cellular connectivity between the remote UE and a relay UE upon determining the direct cellular connectivity between the remote UE and the base station is not available. In another embodiment, the method includes establishing a connection between the remote UE and the base station upon determining the D2D cellular connectivity between the remote UE and the relay UE is not available. In another embodiment, the connection is established by initiating a local connection between an application layer of the remote UE and an application layer of the remote tactical radio. In another embodiment, the connection is established by initiating a mesh connection between a physical layer of the remote tactical radio and a physical layer of a relay tactical radio. In another embodiment, the connection is established by initiating a local connection between an application layer of the relay tactical radio and the relay UE. In another embodiment, the connection is established by initiating a cellular connection between a physical layer of the relay UE and the base station.

BRIEF DESCRIPTION OF THE DRAWINGS

Implementations of the concepts disclosed herein may be better understood when consideration is given to the following detailed description thereof. Such description refers to the included drawings, which are not necessarily to scale, and in which some features may be exaggerated, and some features may be omitted or may be represented schematically in the interest of clarity. Like reference numerals in the drawings may represent and refer to the same or similar element, feature, or function. In the drawings:

FIG. 1A depicts a Proximity Service communication, in accordance with one or more embodiments of the present disclosure.

DETAILED DESCRIPTION OF THE INVENTION

Figure 1B:
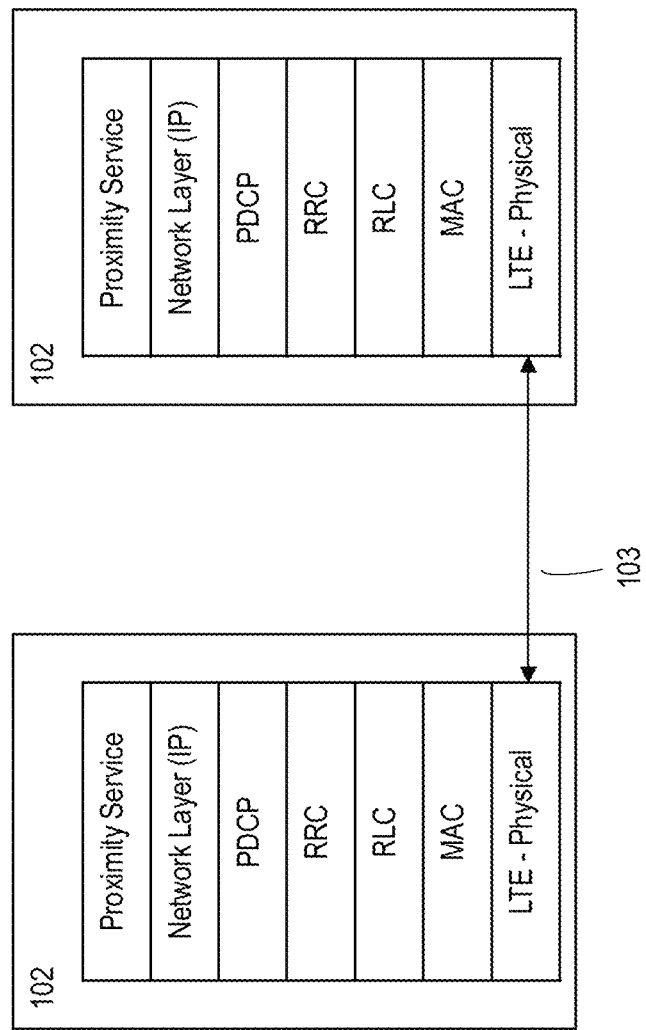
FIG. 1B depicts a protocol stack, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Reference will now be made in detail to the subject matter disclosed, which is illustrated in the accompanying drawings.

Cellular communication is used as the last alternative in a Primary, Alternate, Contingent, Emergency (PACE) philosophy employed by the Military, as a waveform of the cellular communication has a low robustness. The present disclosure may enable the use of 5G cellular as the primary link and fall back on a tactical waveform to bridge communications when the cellular node is subject to denial. Use of the cellular communication as the primary link is desirable because it can sustain much higher throughputs in a spectrally efficient manner than tactical waveforms. The tactical waveforms can become the alternate option and are used for data transport only when 5G is denied.

User Equipment (UE) may communicate (e.g., transmit and/or receive) messages with a base station. The UE may include any suitable device for communicating with the base station, such as, but not limited to, a cellular phone or any device equipped for a cellular network connection. The base station may include an Evolved-Terrestrial Radio Access Network (E-UTRAN) Node B station, commonly referred to as eNB. The base station may also include a 3GPP 5G Next Generation Node B base station, commonly referred to as gNB. The UE may communicate with the base station by one or more air interfaces (e.g., an access mode). The air interface may include both a physical layer and a data link layer. For example, the air interface may include an LTE/LTE-A mode, commonly referred to as a Uu interface or Uu. The base station (e.g., eNB or gNB) may then communicate (e.g., transmit and/or receive) messages with a network. The network may include any suitable 3GPP network architecture, such as, but not limited to, an Evolved Packet Core (EPC). The base station may communicate with the network by any suitable interface, such as, but not limited to an S1 interface.

FIGS. 1A-1B depict a prior art side-link Proximity Service (ProSe) relaying between a Remote UE and Relay UE.

A Remote UE 102 may communicate messages with a Relay UE 104 by Device-to-Device (D2D) Communication 103. The D2D communication may include a PC5 interface. The services supported by D2D communications is known as Proximity Service (ProSe). The D2D communication between UEs is also known as side-link communication. The Release 12 D2D standard supports D2D discovery, network synchronization, resource management and mobility management protocols required to support proximity services. D2D over LTE is available if UEs are within a range of each other and the cellular band is unjammed.

The Relay UE 104 may then communicate the messages with the base station 106 by a Uu interface 105. By relaying information through the Relay UE 104, the Remote UE 102 may thus communicate with the Base Station 106. Additionally, the Relay UE 104 may communicate with a Proximity Service (ProSe) Server 108. The Relay UE 104 may communicate with the ProSe Server 108 by any suitable interface, such as, but not limited to, a PC3 interface 107. As depicted, the PC3 interface 107 is a cellular interface specification to communicate with the ProSe Server 108 which is co-located at the cellular base station 106, although this is not intended to be limiting. The PC3 interface 107 may be relayed over the Uu interface 105 with the base station 106 routing to the ProSe Server 108.

Referring now to FIG. 1B, a protocol stack for the UE (e.g., Remote UE 102 and/or Relay UE 104) may include one or more stack layers. The one or more stack layers may include the following layers: a Proximity Service (ProSe) application layer, a Network Layer (IP), a Packet Data Convergence Control (PDCP) layer, a Radio Resource Control (RRC) layer, a Radio Link Control (RLC) layer, a Medium Access (MAC) layer, and a Physical Layer (LTE-PHY). Release 12 D2D communications may use the LTE uplink physical layer for communicating between UEs.

Figures 2A, 2B, 2C:
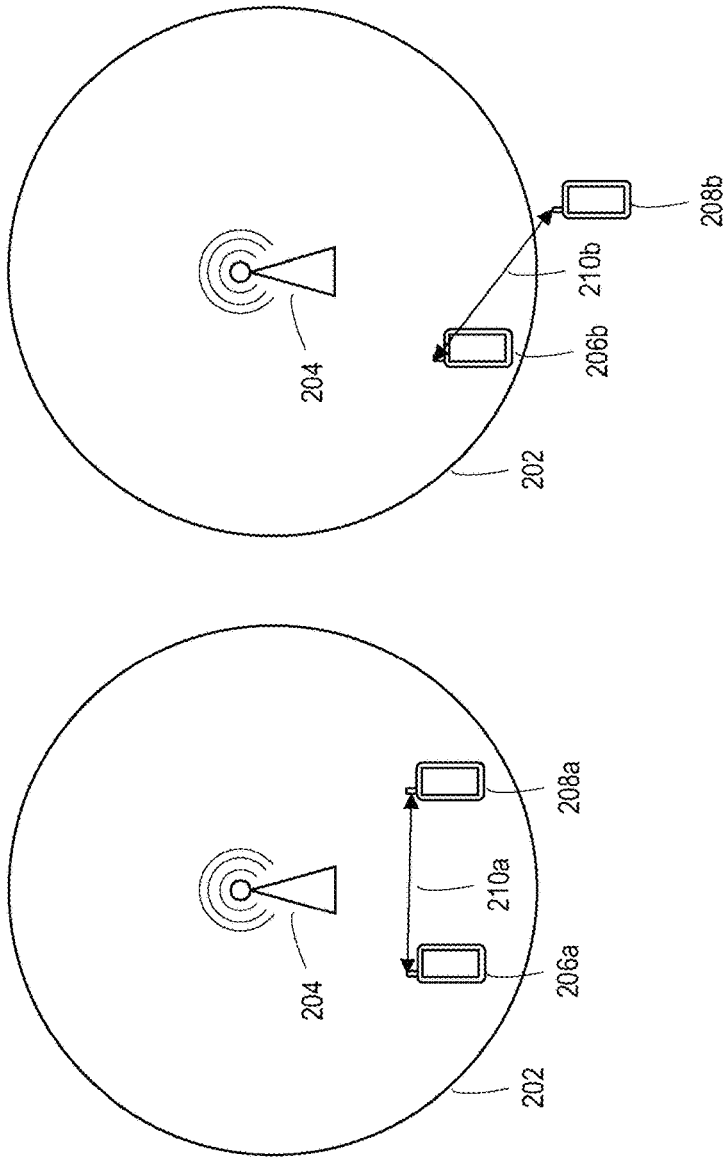
FIGS. 2A-2C depict Proximity Service communication, in accordance with one or more embodiments of the present disclosure.

FIGS. 2A-2C depict scenarios of prior art Proximity Service (ProSe) communication.

D2D communications supports three use cases: In-coverage (FIG. 2A), Partial-coverage (FIG. 2B), and Out-of-coverage (FIG. 2C). "Device to Device Communication in LTE", by Rohde & Schwarz, is incorporated herein by reference in its entirety.

Referring now to FIG. 2A, a UE 206a and a UE 208a may each be within the cellular coverage area 202 of the base station 204. In this regard, both the UE 206a and the UE 208a may communicate with the base station 204 (e.g., by a Uu interface, see FIG. 1A). Additionally, the UE 206a may communicate with the UE 208a by a D2D communication 210a.

Referring now to FIG. 2B, a UE 206b may be within the cellular coverage area 202 of the base station 204. In this regard, the UE 206b may communicate with the base station 204 (e.g., by a Uu interface, see FIG. 1A). The UE 208b may be outside of the cellular coverage area 202 of the base station 204. In this regard, the UE 208b may not communicate with the base station 204 directly. However, the UE 208b may communicate with the UE 206b by a D2D communication 210b. The UE 206b may then relay information from the UE 208b to the base station 204.

Referring now to FIG. 2C, a UE 208c and a UE 208c may be outside of the cellular coverage area 202 of the base station 204. In this regard, the UE 206c and the UE 208c may not communicate with the base station 204. However, the UE 206c may communicate with the UE 208c by a D2D communication 210c.

Figure 3:
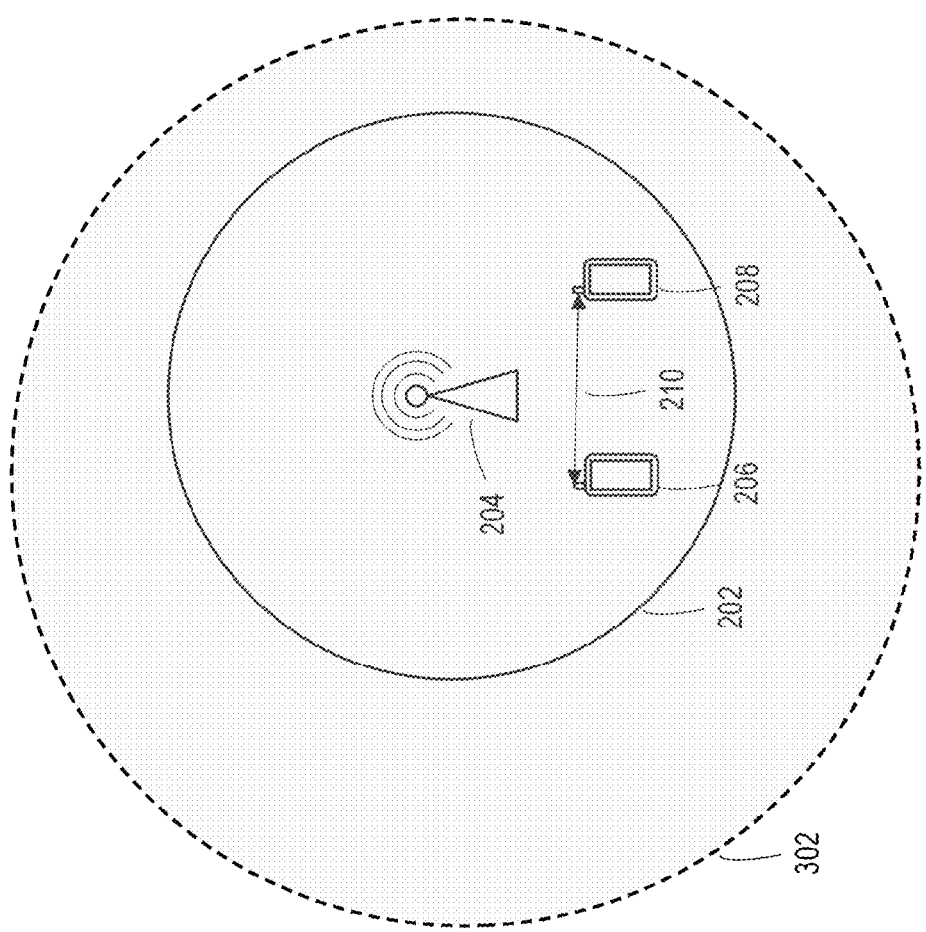
FIG. 3 depicts a highly contested theater, in accordance with one or more embodiments of the present disclosure.

FIG. 3 depicts a theater 300, in accordance with one or more embodiments of the present disclosure.

In embodiments, a theater 300 may be highly contested. In a highly contested theater, an area of enemy denial 302 fully encompasses the coverage area 202 of the base station 204. Where the coverage area 202 is fully encompassed by the enemy denial 302, all cellular communication (e.g., 4G/5G) may be denied. In this regard, a communication (e.g., by a Uu interface) between the remote UE 206 and the base station 204 may be denied. Furthermore, a D2D communication 210 between the remote UE 206 and the relay UE 208 may be denied. Thus, the D2D communication 210 will not allow the relay UE 208 to relay communication for the remote UE 206 to the base station 204.

Figure 4:
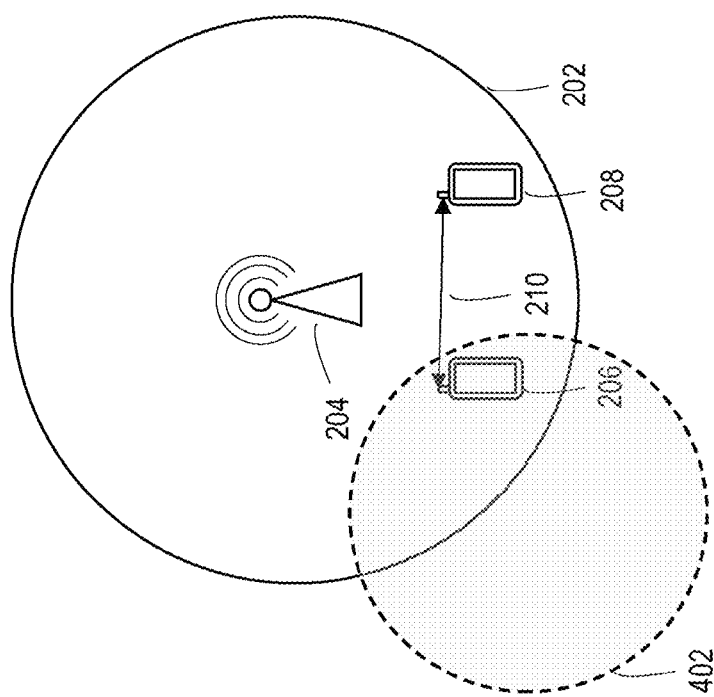
FIG. 4 depicts a contested theater, in accordance with one or more embodiments of the present disclosure.

FIG. 4 depicts a theater 400, in accordance with one or more embodiments of the present disclosure.

In embodiments, a theater 400 may be contested. In a contested theater, an area of enemy denial 402 denies only a portion of the coverage area 202 of the base station 204. Cellular communication may be denied where the coverage area 202 and the area of enemy denial 402 overlap. Thus, if the enemy is denying access to a subset of nodes then those nodes cannot communicate with other cellular nodes using the D2D capabilities provided by cellular standards (e.g., LTE-A release 12 and later).

Referring now to FIGS. 5-12, a system and a method is presented that enables the use of 5G in contested environments. Cellular nodes (e.g., UEs) in the network may be paired with a tactical radio capable of operating in a contested area. The tactical radio may be configured to communicate with other tactical radios by a tactical mesh ad-hoc networking waveform for healing a broken or denied cellular connection with a base station.

Tactical Radios and Tactical Waveforms are generally described in "A Comparative Analysis of Network Approaches For Tactical Wireless Communications, Validated By Joint Communication Simulation System (JCSS) Simulations: A Swedish Perspective", by Fredrik Maxen 2011; and "Techniques for Tactical Radio Operations", Army Techniques Publication (ATP) 6-02.53, both of which are incorporated herein by reference in its entirety.

Figure 5:
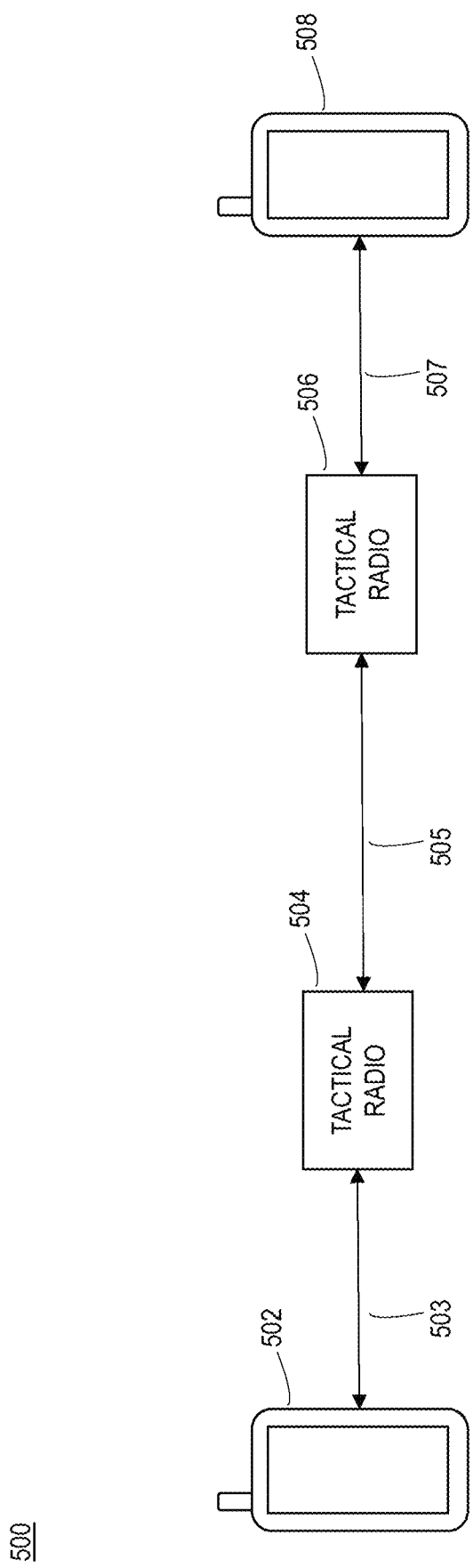
FIG. 5-10 depicts a system, in accordance with one or more embodiments of the present disclosure.

FIG. 5 illustrates a system 500, in accordance with one or more embodiments of the present disclosure.

In embodiments, the system 500 includes a remote UE 502, a remote tactical radio 504, a relay tactical radio 506, and a relay UE 508.

The remote UE 502 and the relay UE 508 may be configured to communicate (e.g., transmit and/or receive) messages with a base station (e.g., base station 204). The remote UE 502 and the relay UE 508 may include any suitable device for communicating with the base station, such as, but not limited to, a cellular phone or any device equipped for a cellular network connection. The UEs 502, 508 may communicate with the base station by one or more air interfaces. The air interface may include both a physical layer and a data link layer. For example, the air interface may include a wideband LTE/LTE-A mode, commonly referred to as a Uu interface or Uu. The remote UE 502 may be prevented from communicating directly with the base station and may similarly be denied from making a D2D side-link with the relay UE 508 (e.g., the remote UE is disposed in enemy denial 302 or enemy denial 402, the remote UE is disposed out of the cellular coverage area 202, or the base station 204 may be destroyed by a kinetic attack). Optionally, the relay UE 508 may not be denied, such that the relay UE 508 may transmit and receive messages to the base station by the Uu interface.

In embodiments, the remote UE 502 and the remote tactical radio 504 may be coupled by a first connectivity interface 503. Similarly, the relay tactical radio 506 and the relay UE 508 may be coupled by a second connectivity interface 507. For example, the first connectivity interface 503 and/or the second connectivity interface 507 may include a PC5 interface. The PC5 interface may be transported over one or more of WiFi, Bluetooth, NFC, Ethernet or USB connection. Depending on a type of UE (e.g., remote UE 502, relay UE 508) and a type of tactical radio (e.g., remote tactical radio 504, relay tactical radio 506), an adapter (not depicted) may be required for the transport of the PC5 interface. For example, where the tactical radio includes an AN/PRC-162 tactical radio, the adapter may be required for WiFi, Bluetooth, NFC, or Ethernet connections, but may not be required for USB connections.

In embodiments, the remote tactical radio 504 and the relay tactical radio 506 may be configured to communicate (e.g., transmit and receive) by a mesh waveform 505 (also referred to herein as a tactical waveform). A bridging range between the tactical radios 504, 506 may be dependent on a link coverage range of the mesh waveform 505. As may be understood, a tactical radio may include any suitable transceiver (not depicted) for transmitting and receiving communications by the mesh waveform 505.

The mesh waveform 505 may include one or more tactical wireless ad hoc network (MANET) waveforms that are anti-jam and capable of operating in a tactical contested environment. The one or more MANET waveforms may be used to transport one or more PC5 messages between the remote tactical radio 504 and the relay tactical radio 506. The one or more MANET waveforms may include one or more frequency bands. Similarly, the MANET waveforms may include multi-band frequency bands. Where the system 500 is configured with a first MANET waveform in a first channel and a second tactical waveform in a second channel, the first MANET may be of different robustness as compared to the second MANET. Furthermore, the first MANET may support a different data rate and/or network throughput as compared to the second MANET. Any one of the MANET waveforms may be used to transport the PC5 messages between the remote UE 502 and the relay UE 508.

In embodiments, the relay UE 508 may be configured to communicate with a base station (e.g., eNB/gNB). In this regard, the relay UE 508 may act as a relay UE for the remote UE 502, such that indirect communications between the remote UE 502 and the base station may be established. For example, the relay UE 508 may be configured to communicate with the base station by a Uu interface.

In embodiments, the remote tactical radio 504 and the relay tactical radio 506 are configured to generate a threat aware networking model. The threat aware networking model may select the relay UE 508 to counter the threat (e.g., where the remote UE 502 is denied from communicating by a Uu interface). Similarly, the threat aware networking model may select one or more tactical radios to counter the threat. The threat aware networking model may generate a network topology for the system 500, in accordance with one or more embodiments of the present disclosure.

The system 500 should not be limited to a remote UE 502, a relay UE 508, a remote tactical radio 504, and a relay tactical radio 506. For example, the system 500 may include a plurality of relay tactical radios, where such relay tactical radios are each coupled with a relay UE (see FIG. 10, for example). By way of another example, the system 500 may include one or more intermediate tactical radios disposed between the relay tactical radio 504 and the remote tactical radio 502 (see FIG. 8, for example). Thus, the connection may be established in various network topologies, as described further herein. The remote tactical radio 504 and relay tactical radio 506 may include any tactical radio, such as, but not limited to, a manpack, a handheld radio, a vehicular radio, or an airborne radio. As may be understood, any combination of single, two-channel, multi-channel tactical radios can be used to create network topologies that are mission specific.

Figure 6:
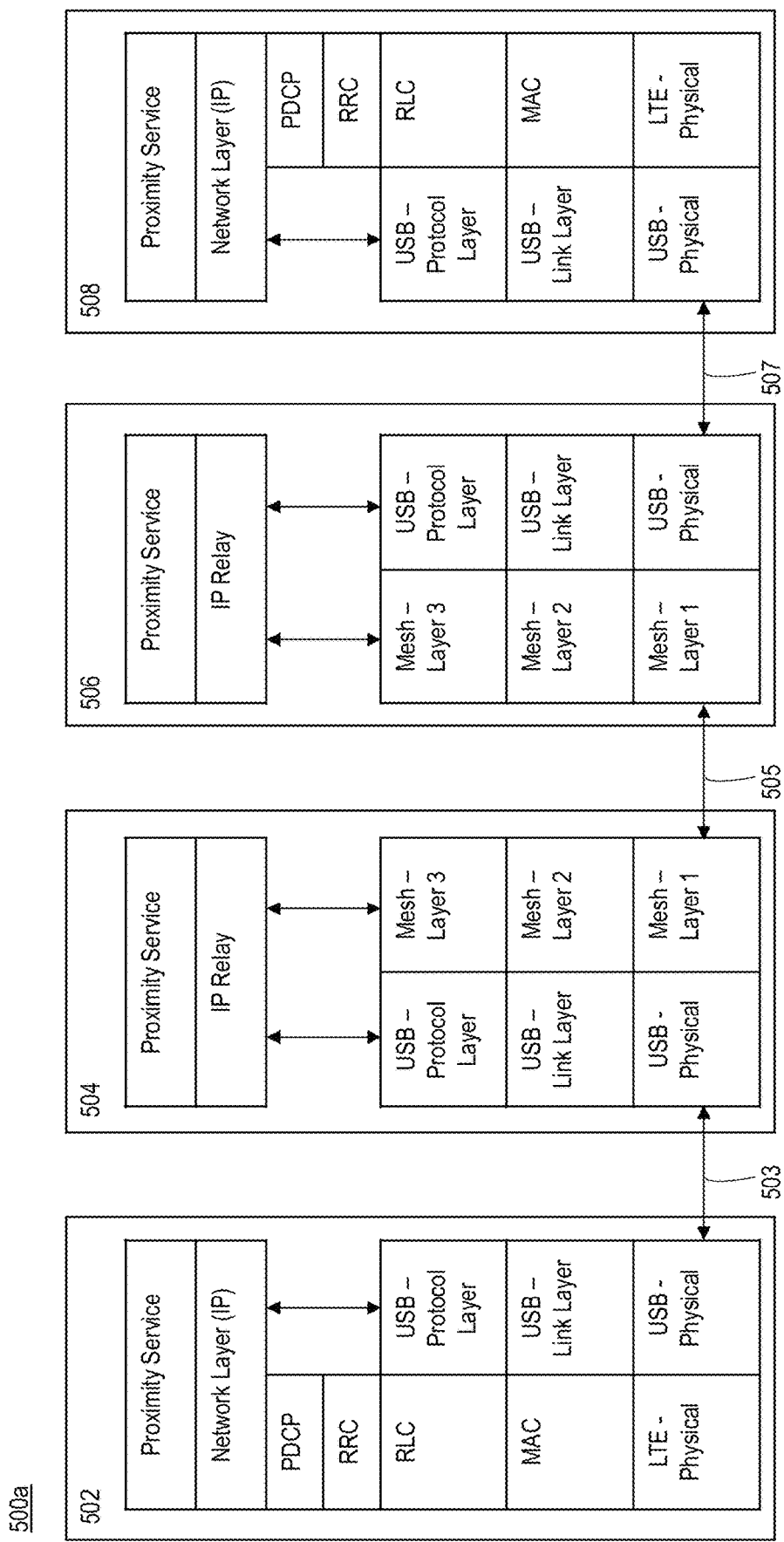

FIG. 6 depicts a system 500a, in accordance with one or more embodiments.

The system 500a may be identical to the system 500, with the addition of the following:

In embodiments, the remote tactical radio 504 may be configured to communicate with the remote UE 502 without adjusting a protocol stack of the remote UE 502. In this regard, an application layer of the remote UE 502 may communicate with an IP relay layer of the remote tactical radio 504. Any messages transmitted to and/or from the remote tactical radio 504 over the first connectivity interface 503 may be transmitted to and/or from the application layer of the remote UE 502. Similarly, the relay tactical radio 506 may be configured to communicate with the relay UE 508 without adjusting a protocol stack of the relay UE 508.

As discussed previously herein, a UE may include the following protocol layers: a Proximity Service (ProSe) application layer, a Network Layer (IP), a Packet Data Convergence Control (PDCP) layer, a Radio Resource Control (RRC) layer, a Radio Link Control (RLC) layer, a Medium Access (MAC) layer, and a Physical Layer (LTE-PHY). The remote UE 502 and the relay UE 508 may include one or more of the previously described protocol layers. Furthermore, the remote UE 502 and the relay UE 508 may include one or more of the following layers: a USB-Protocol Layer, a USB-Link Layer, and a USB-Physical Layer. For example, the remote UE 502 and the relay UE 508 may be configured with any USB standard, such as, but not limited to USB 1.1, 2.0, 3.0, or 3.1. The USB-Protocol Layer may be configured to receive and/or transmit data from the Network Layer (IP), to the USB-Link Layer. Similarly, the USB-Link layer may be configured to receive and/or transmit data from the USB-Protocol Layer, to the USB-Physical Layer. Similarly, the USB Physical Layer may be configured to receive and/or transmit data from the USB-Link Layer, over a connectivity interface (e.g., first connectivity interface 503 or second connectivity interface 507).

The remote tactical radio 504 and the relay tactical radio 506 may also include one or more of the following protocol layers: a Proximity Service (ProSe) application layer, an Internet Protocol (IP) Relay Layer, a USB-Protocol Layer, a USB-Link Layer, a USB-Physical Layer, a Mesh-Layer 1, a Mesh-Layer 2, and/or, a Mesh-Layer 3.

The ProSe application layer of the remote tactical radio 504 may keep track of a mesh network connectivity status of a plurality of tactical radio nodes in a network and may keep track of a cellular connectivity status of a UEs connected to the plurality of tactical radios. The combination of the mesh network connectivity and cellular connectivity strength is used to create a connectivity metric. The relay tactical radio 506 coupled with the relay UE 508 may be selected from the plurality of tactical radios based on the connectivity metric. For example, the relay tactical radio 506 and the relay UE 508 may be selected where the relay UE 508 has a direct cellular connectivity with a base station (e.g., base station 204).

For example, the remote UE 502 may initiate a local USB connection to transport PC5 messages between the application layers of the remote UE 502 and the remote tactical radio 504 for transporting a PC5 message. The local USB connection may be by the first connectivity interface 503 between the USB-physical layers of the remote UE 502 and the remote tactical radio 504. In this regard, the USB-Physical Layer may be configured to receive and/or transmit data over the connectivity interface 503 to a USB-Protocol Layer. The USB-Protocol Layer may be configured to receive and/or transmit data from the USB Physical Layer, to the USB-Protocol Layer. Similarly, the USB-Protocol Layer may be configured to receive and/or transmit data from the USB-Link Layer, to the IP Relay layer.

The remote tactical radio 504 may then select the relay tactical radio 506 and the relay UE 508 based on a connectivity metric. The connectivity metric may indicate that the relay tactical radio 506 and the relay UE 508 have a highest connectivity with the base station 204. For example, the connectivity metric may be determined by a ProSe application layer of the remote tactical radio 504. The remote tactical radio 504 may then communicate the PC5 message with the relay tactical radio 506 by the mesh waveform 505.

In response to the communication from the remote tactical radio 504, the relay tactical radio 506 may initiate a local connection with the relay UE 508. For example, the relay tactical radio 506 may initiate a USB connection between the application layers of the relay tactical radio 506 and the relay UE 508 for communicating the PC5 messages. The USB connection may be by the second connectivity interface 507 between the USB-physical layers of the relay UE 508 and the relay tactical radio 506. In this regard, the USB-Physical Layer may be configured to receive and/or transmit data over the connectivity interface 507 to a USB-Protocol Layer. The USB-Protocol Layer may be configured to receive and/or transmit data from the USB Physical Layer, to the USB-Protocol Layer. Similarly, the USB-Protocol Layer may be configured to receive and/or transmit data from the USB-Link Layer, to the IP Relay layer.

The LTE-Physical Layer of the relay UE 508 may then be configured to transmit and/or receive communications with a base station (e.g., base station 204) by a Uu interface (e.g., Uu interface 105). In this regard, the remote tactical radio 504, the relay tactical radio 506, and the relay UE 508 may act as a bridge or relay between the base station and the remote UE 502. Thus, the remote UE 502 may initiate a bi-directional communication with the base station 204 by the remote tactical radio 504, the relay tactical radio 506, and the relay UE 508.

Although the remote UE 502, the remote tactical radio 504, the relay tactical radio 506, and the relay UE 508 may be described as including one or more USB layers, this is not intended to be limiting. In this regard, the remote UE 502, the remote tactical radio 504, the relay tactical radio 506, and the relay UE 508 may include one or more layers which are suitable for WiFi, Bluetooth, NFC, Ethernet or USB connection (e.g., by the first connectivity interface 503 or the second connectivity interface 507).

Referring generally to FIGS. 7-10, the system 500 is described in reference to one or more network topologies.

As discussed previously, the system 500 may include a network topology including a plurality of UEs and a plurality of tactical radios. In embodiments, the remote tactical radio 504 is configured to select the relay tactical radio 506 based on a connectivity metric. The connectivity metric may include a cellular connectivity status of one or more UEs (e.g., relay UE 508, relay UE 1004, relay UE 1008). The connectivity metric may also include a mesh waveform status of various tactical radios (e.g., remote tactical radio 504, relay tactical radio 506, intermediate tactical radio 802, relay tactical radio 1002, relay tactical radio 1006).

Figure 7:
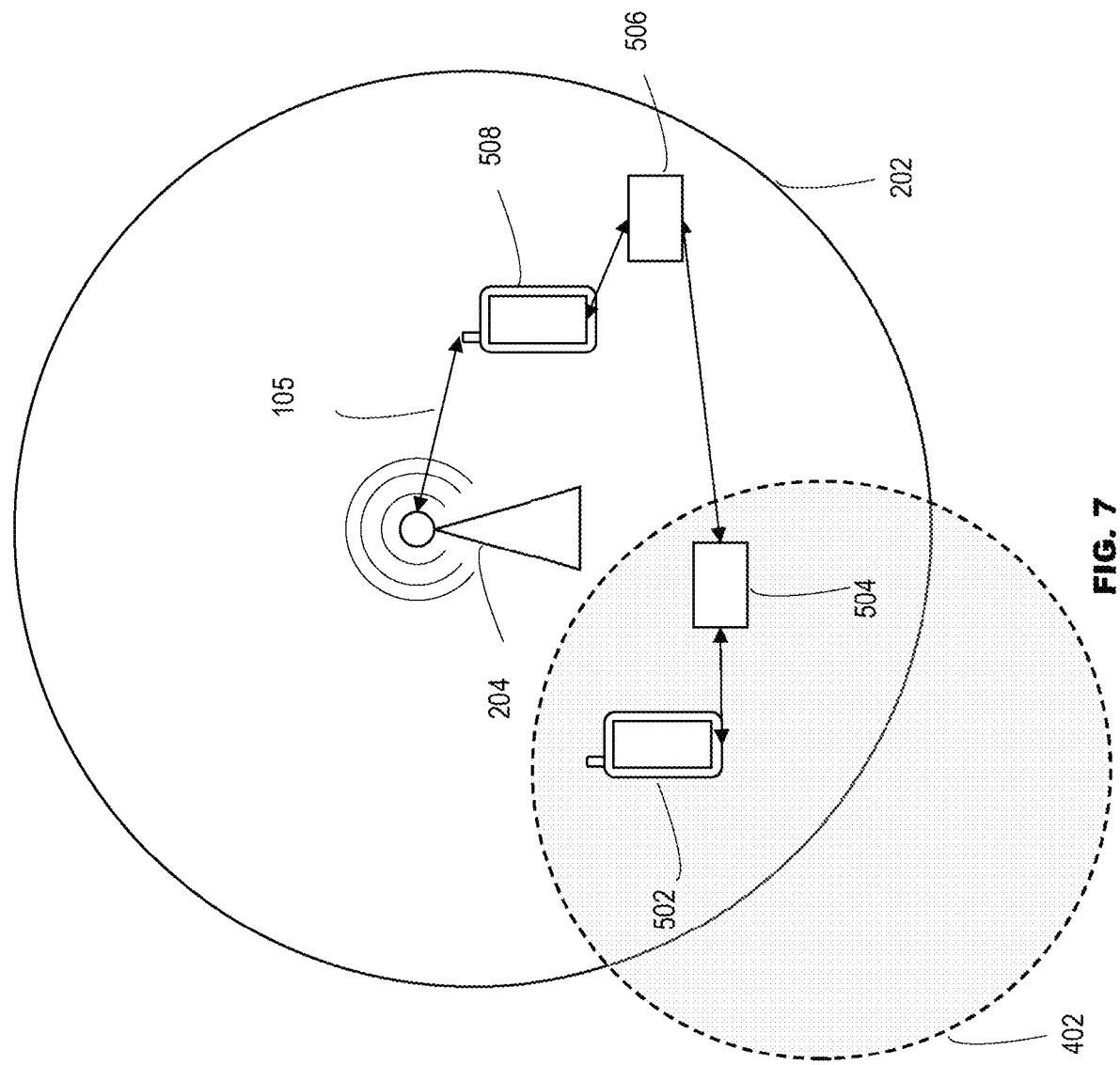

Referring now to FIG. 7, the system 500 is described in accordance with one or more embodiments of the present disclosure.

Due to an area 402 of enemy denial, the remote UE 502 may be prevented from making a Uu interface with the base station 204 and similarly may be prevented from making a D2D side-link with the relay UE 508. However, the remote UE 502 may establish a connection with the relay UE 508, and subsequently with the base station 204, by the first connectivity interface 503, the remote tactical radio 504, the mesh waveform 505, the relay tactical radio 506, and the second connectivity interface 507. Thus, indirect communications between the remote UE 502 and the base station 204 may be established.

In embodiments, the remote tactical radio 504 may select (e.g., by the ProSe application layer based on the connectivity metric) the relay tactical radio 506 and the relay UE 508.

Figure 8:
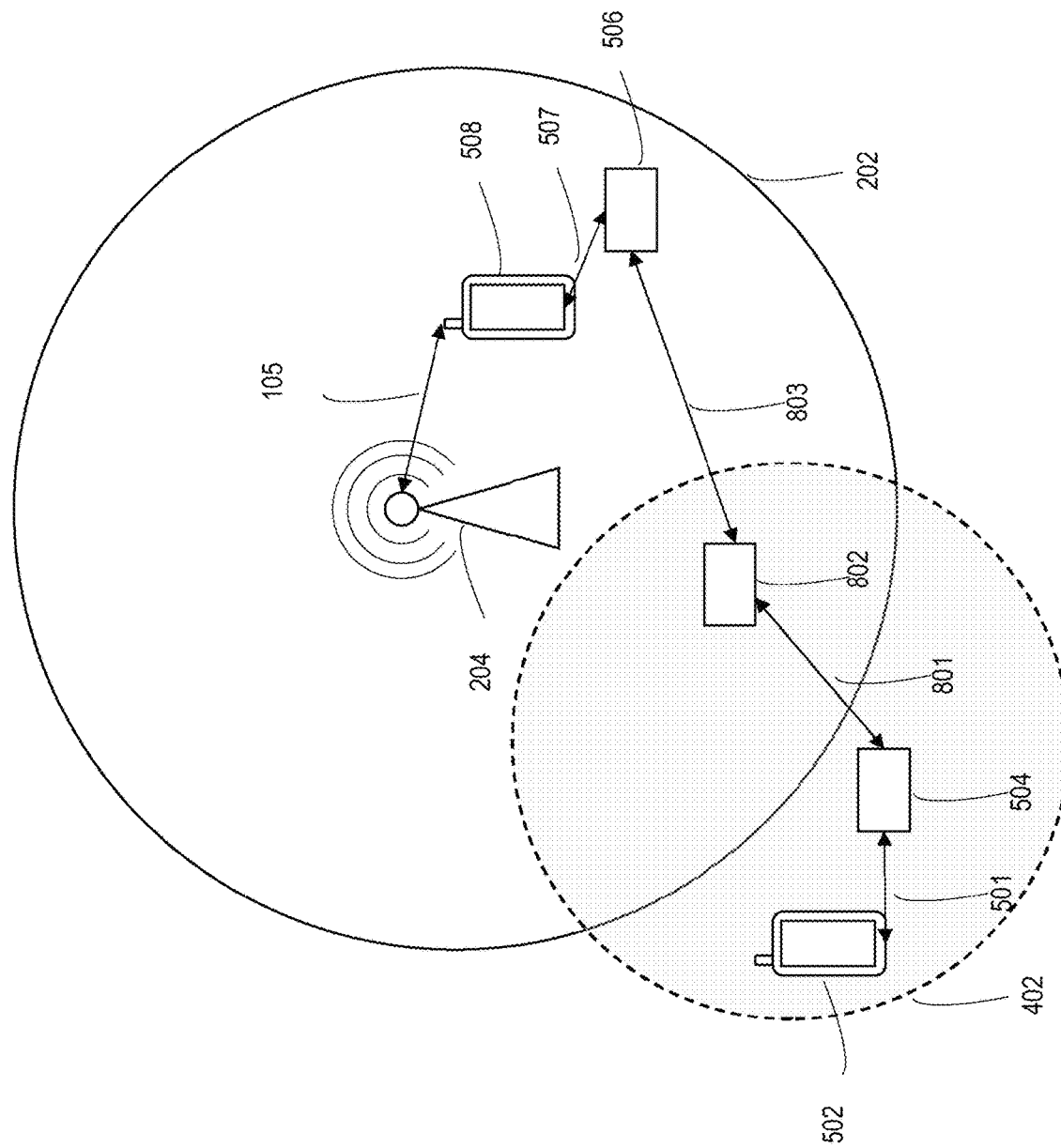

FIG. 8 depicts an exemplary network topology of the system 500, in accordance with one or more embodiments of the present disclosure.

In embodiments, the system 500 further includes at least one intermediate tactical radio 802. The Remote UE 502 may route communications to the relay UE 508 (and subsequently the base station 204) by the remote tactical radio 504, the at least one intermediate tactical radio 802, and the relay tactical radio 506. The at least one intermediate tactical radio 802 may be automatically selected by the remote tactical radio (e.g., by a ProSe application layer based on the connectivity metric). The at least one intermediate tactical radio 802 may route communications between the remote tactical radio 504 and the relay tactical radio 506 by one or more intermediate tactical waveforms 803.

Figure 9:
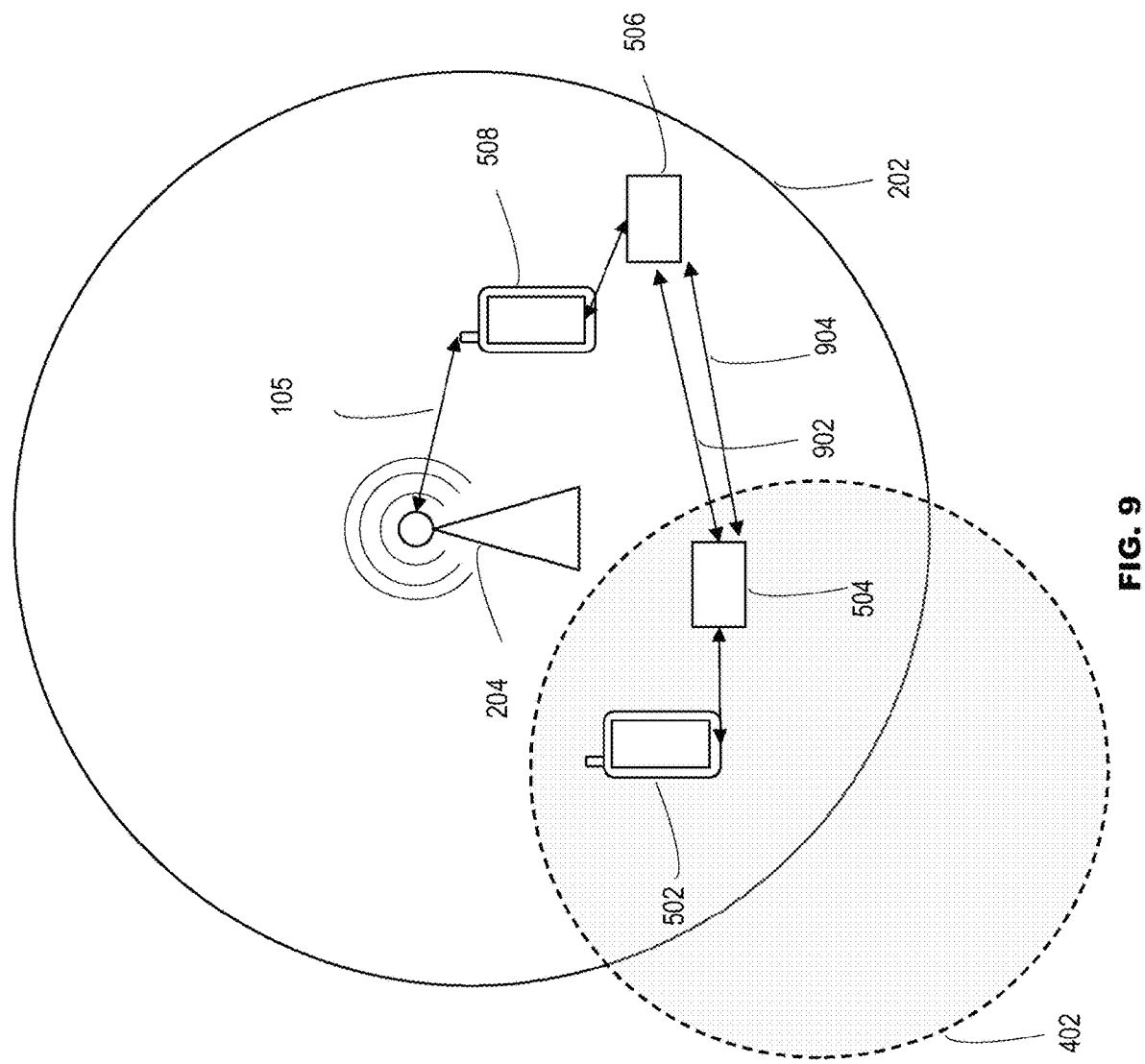
Figure 10:
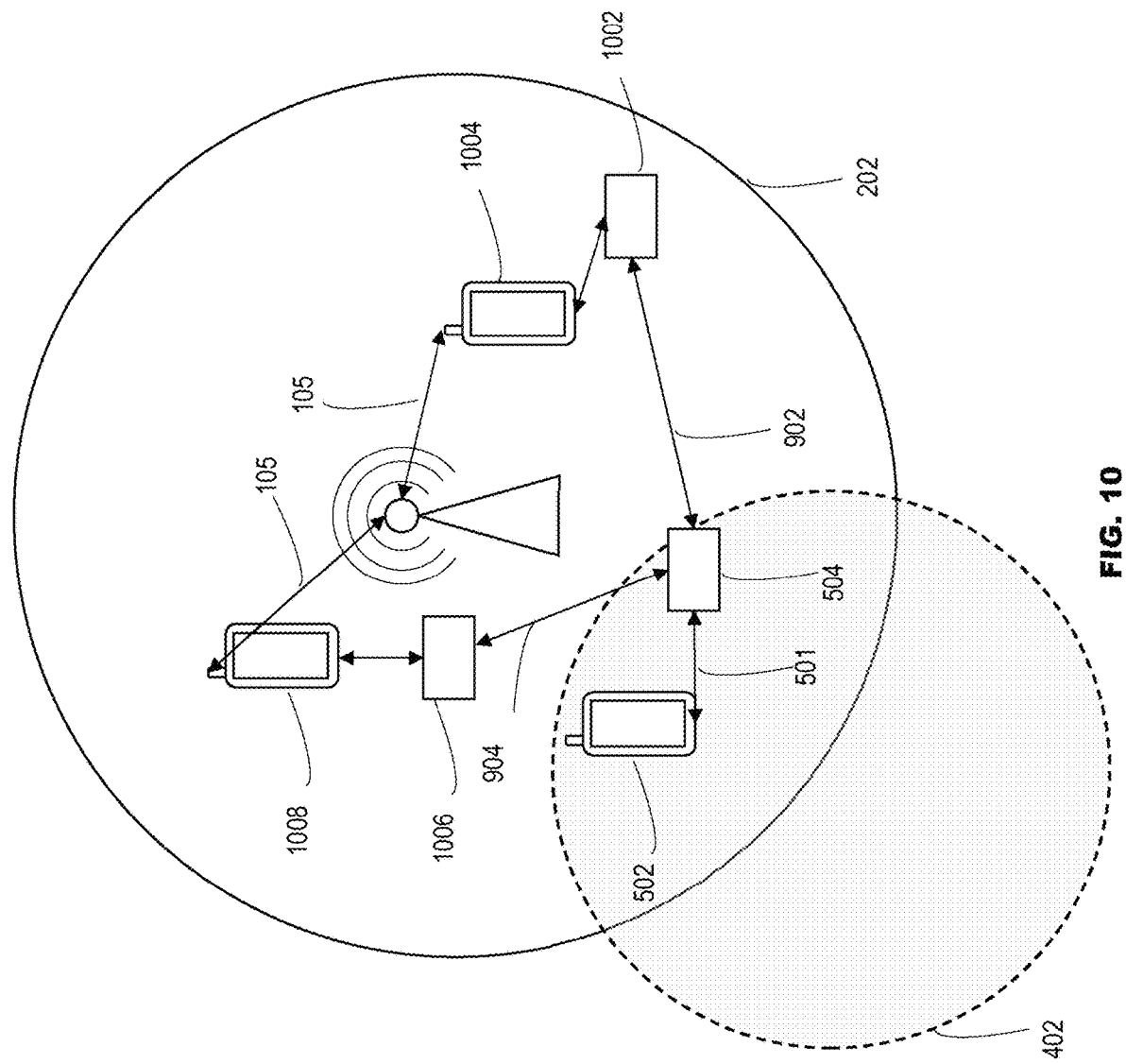

Referring now to FIGS. 9-10, an implementation of the system 500 including a multi-channel tactical connection is disclosed, in accordance with one or more embodiments of the present disclosure.

In embodiments, a tactical radio of the system 500 (e.g., remote tactical radio 504, relay tactical radio 506, relay tactical radio 1002, relay tactical radio 1004) may include two or more channels each configured to host a tactical waveform. For example, the remote tactical radio 504 may include a multi-channel tactical radio including at least a first channel 902 and a second channel 904. For example, the remote tactical radio 504 and/or the relay tactical radio 506 may include an AN/PRC-162 tactical radio including two-channels.

Each channel 902, 904 may host a waveform simultaneously to either improve a redundancy or improve a data transmission rate of a signal. A redundant connectivity may be established by transmitting the same communication in different channels. An improved data-rate connectivity may also be established by transmitting a first packet of data over the first channel 902, together with a second packet of data over the second channel 904, where the first packet of data and the second packet of data are different (e.g., by inverse multiplexing and/or by demultiplexing).

As may be understood, the tactical radio may include any suitable multi-channel radio. For example, the tactical radio may include, but is not limited to, an AN/PRC-162 manpack. The AN/PRC-162 manpack is a 2-channel software-defined radio (SDR) capable of hosting two simultaneous anti-jam waveforms, one waveform on each channel.

Referring now to FIG. 9, the system 500 is described, in accordance with one or more embodiments of the present disclosure.

In embodiments, the first channel 902 and the second channel 904 may be transmitted to and received from the relay transmit radio 506. For example, the remote tactical radio 504 may be configured to redundantly transmit and receive the information on the first channel 902 and the second channel 904, for improving a robustness of the information. By way of another example, the information on the first channel 902 may be different from the information on the second channel 904. In this regard, a data-rate may be improved, at a cost of robustness.

Referring now to FIG. 10, the system 500 is described, in accordance with one or more embodiments of the present disclosure.

In embodiments, the Remote UE 502 establishes a connection with a first relay UE 1002 (e.g., by the channel 902) and a second relay UE 1004 (e.g., by the channel 904). The first relay UE 1002 and the second relay UE 1004 may then communicate with the base station 204 (e.g., by a Uu interface 105). For example, by the channels 902, 904 waveforms with the same information may be transmitted, for improving a robustness of the information. In other embodiments, the channels 902, 904 may transmit different data, for improving a data transfer rate.

Figure 11:
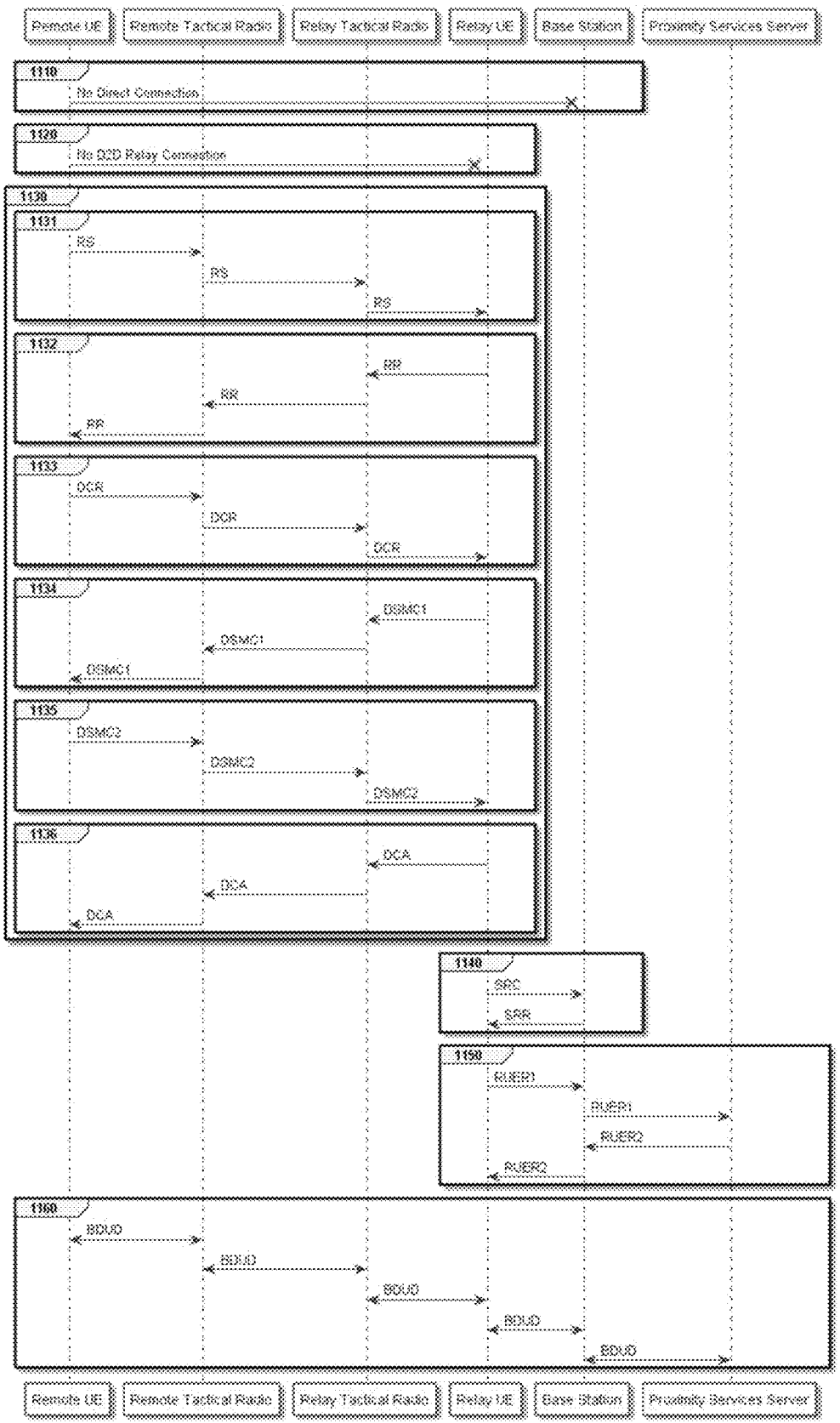
FIG. 11 depicts a sequence diagram of a method, in accordance with one or more embodiments of the present disclosure.

Referring now to FIG. 11, a method 1100 is disclosed, in accordance with one or more embodiments of the present disclosure. The embodiments and the enabling technologies described previously herein in the context of system 500 should be interpreted to extend to the method 1100. It is further recognized, however, that the method 1100 is not limited to the system 500.

In a step 1110, a remote UE (e.g., remote UE 502) checks for direct cellular connectivity with the base station (e.g., base station 204). If direct connectivity is available then communication is made by the cellular connection (e.g., Uu interface 105) directly with the base station. A connection from the remote UE to the base station may or may not be possible as it is dependent on an amount of noise floor raised by an enemy jammer and a distance to the base station.

In a step 1120, if direct connectivity with the base station is not available, the remote UE checks for a device-to-device (D2D) cellular connection with a relay UE (e.g., relay UE 506). The remote UE may check for the D2D connection by a standard ProSe services over LTE with a P5 cellular interface specification (e.g., D2D connectivity).

In a step 1130, if D2D cellular connectivity is not available between the Remote UE and the Relay UE, a connection is established between the Remote UE and the Relay UE by a remote tactical radio (e.g., remote tactical radio 504) and a relay tactical radio (e.g., relay tactical radio 506, relay tactical radio 1002, relay tactical radio 1006). By the connectivity, the Remote UE may be indirectly connected to the base station. The indirect connectivity may include: a local connection between an application layer of the remote UE and an application layer of the remote tactical radio (e.g., by the first connectivity interface 503); a mesh connection between a physical layer of the remote tactical radio and a physical layer of the relay tactical radio (e.g., by the mesh waveform 505); a local connection between an application layer of the relay tactical radio and the relay UE (e.g., by the second connectivity interface 507); and a cellular connection between a physical layer of the relay UE and the base station (e.g., by the Uu interface 105).

A specific implementation of the step 1130 is described by the steps 1131-1136.

The step 1130 may include a step 1131, of making, by the Remote UE, a Relay Solicitation (RS) with the Relay UE through the Remote Tactical Radio and the Relay Tactical Radio.

The step 1130 may include a step 1132, of making, by the Relay UE, a Relay Response (RR) with the Remote UE through the Relay Tactical Radio and the Remote Tactical Radio.

The step 1130 may include a step 1133, of making, by the Remote UE, a Direct Connection Request (DCR) with the Relay UE through the Remote Tactical Radio and the Relay Tactical Radio.

The step 1130 may include a step 1134, making, by the Relay UE, a Direct Security Mode Command (DSMC1) with the Remote UE through the Relay Tactical Radio and the Remote Tactical Radio.

The step 1130 may include a step 1135, of making, by the Remote UE, a Direct Security Mode Complete (DSMC2) with the Relay UE through the Remote Tactical Radio and the Relay Tactical Radio.

The step 1130 may include a step 1136, making, by the Relay UE, a Direct Communication Accept (DCA) with the Remote UE through the Relay Tactical Radio and the Remote Tactical Radio.

In a step 1140, a Relay ProSe of the Relay UE checks to see if the available ProSe resources are sufficient for meeting the needs of the Remote UE. If the available ProSe resources are insufficient, the Relay ProSe requests resource configuration (SRC) from the base station and may receive a resource reconfiguration (SRR) from the base station.

In a step 1150, the Relay UE reports (RUER1) to the ProSe server and receives a response (RUER2) from the ProSe Server. Upon receiving the response, end-to-end connectivity between the Remote UE and the ProSe server may be established.

In a step 1160, Bi-Directional User Data (BDUD) is transmitted between the Remote UE, the Remote Tactical Radio, the Relay Tactical Radio, the Relay UE, the Base Station, and the ProSe Server.

Figure 12:
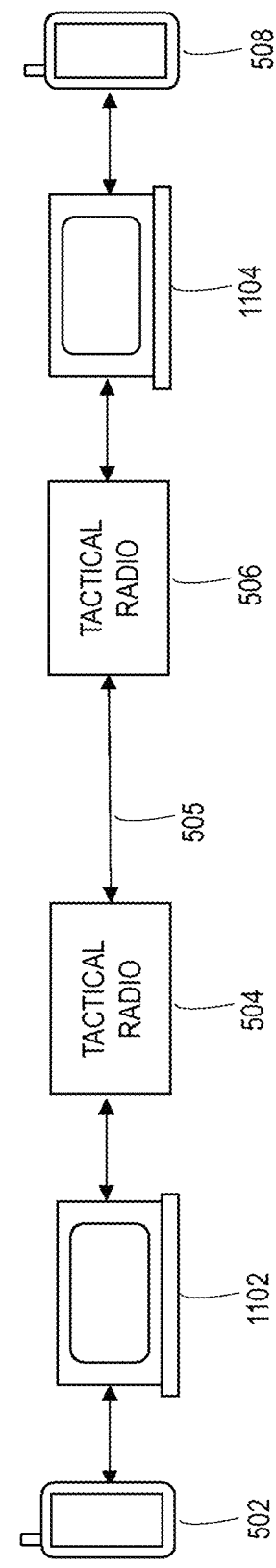
FIG. 12 depicts a system, in accordance with one or more embodiments of the present disclosure.

Referring now to FIG. 12, a system 1200 is described in accordance with one or more embodiments of the present disclosure.

The system 1200 may be identical to the system 500, with the exception of the following:

Although the first connectivity interface 503 and the second connectivity interface 507 has been described as one or more of a WiFi, Bluetooth, NFC, Ethernet or USB connection, this is not intended as a limitation on the present disclosure. For example, the first connectivity interface 503 may include a remote computer 1102 and the second connectivity interface 507 may include a relay computer 1104. By the remote computer 1102, the remote UE 502 and the remote tactical radio 504 may be coupled. Communications between the remote UE and the remote tactical radio 504 may be routed through the remote computer 1102. Similarly, by the relay computer 1104, the relay tactical radio 506 and the relay UE 508 may be coupled. Communications between the relay UE 508 and the relay tactical radio 506 may be routed through the relay computer 1104. For example, the remote UE 502 may communicate the PC5 message over USB to the remote computer 1102. The remote computer 1102 may communicate the PC5 message over USB to the remote tactical radio 504. The remote tactical radio 504 may communicate with the relay tactical radio 506 by the mesh waveform 505. The relay tactical radio 506 may then communicate the PC5 message over USB to the relay computer 1104. The relay computer 1104 may then communicate the PC5 message over USB to the relay UE 508. Thus, bi-directional communication may be established between the remote UE 502 and the relay UE 508 (and subsequently the base station 204).

In embodiments the remote computer 1102 may include a proximity service application. By the proximity service application, the remote computer 1102 may select the relay tactical radio 506 and the relay UE 508 (e.g., based on a connectivity metric). The remote computer 1104 may determine tactical relaying services are required, as no direct connection or indirect (by D2D) connection exists between the remote UE 502 and the base station 204. The remote computer 1102 then initiates the process to find the relay UE 508, ascertains the relay tactical radio 506 connected to the relay UE 508, and forwards the PC5 message to the remote tactical radio 504 for communication. For example, the proximity service application may be maintained on a memory of the remote computer 1102.

It is to be noted that the specific order of steps in the foregoing disclosed methods are examples of exemplary approaches. Based upon design preferences, it is understood that the specific order of steps in the method can be rearranged while remaining within the scope of the present disclosure. It is believed that the present invention and many of its attendant advantages will be understood by the foregoing description. It is also believed that it will be apparent that various changes may be made in the form, construction, and arrangement of the components thereof without departing from the scope and spirit of the present disclosure. The form herein described being an explanatory embodiment thereof.

What is claimed:

1. A system comprising:
    a remote User Equipment (UE) configured to communicate by a cellular waveform;
    a remote tactical radio configured to communicate by a tactical waveform, wherein the tactical waveform comprises a wireless ad hoc network waveform, wherein the remote tactical radio is physically coupled with the remote UE by a first connectivity interface for transmitting information to and receiving the information from the remote UE;
    a relay UE configured to communicate by the cellular waveform; and
    a relay tactical radio configured to communicate by the tactical waveform, wherein the relay tactical radio is physically coupled with the relay UE by a second connectivity interface for transmitting the information to and receiving the information from the relay UE, wherein the relay tactical radio is configured for transmitting the information to and receiving the information from the remote tactical radio by the tactical waveform;
    wherein the remote UE is configured to check for and determine a direct cellular connectivity between the remote UE and a base station is denied;
    wherein the remote UE is configured to check for and determine a device-to-device (D2D) cellular connection by a PC5 interface between the remote UE and the relay UE is denied in response to determining the direct cellular connectivity between the remote UE and the relay UE is denied;
    wherein the remote UE is configured to establish a connection between the remote UE and the relay UE in response to determining the D2D side-link by the PC5 interface between the remote UE and the relay UE is denied, the connection established by way of the first connectivity interface, the tactical waveform between the remote tactical radio and the relay tactical radio, and the second connectivity interface.

2. The system of claim 1, further comprising the base station including a cellular area, wherein the relay UE is configured for transmitting the information to and receiving the information from the base station by the cellular waveform, wherein the remote UE is configured to bi-directionally communicate with the base station by the remote tactical radio, the relay tactical radio, and the relay UE.

3. The system of claim 2, wherein the relay UE is configured to determine an available proximity services (ProSe) resources are insufficient for bidirectional communication between the remote UE and the base station, wherein the relay UE is configured to request for a resource configuration from the base station in response to determining the available ProSe resources are insufficient.

4. The system of claim 1, wherein the remote tactical radio is a multi-channel tactical radio including at least a first channel and a second channel, wherein the first channel is operated in a first frequency band and the second channel is operated in a second frequency band.

5. The system of claim 4, wherein the remote tactical radio is configured to at least one of redundantly transmit and receive the information on the first channel and the second channel for improving a robustness of the information or non-redundantly transmit and receive the information on the first channel and the second channel for improving a data-rate.

6. The system of claim 5, wherein the information on the first channel and the second channel are transmitted to and received from the relay tactical radio.

7. The system of claim 5, further comprising:
an additional relay UE configured to communicate by the cellular waveform; and
an additional relay tactical radio configured to communicate by an additional tactical waveform, the additional relay tactical radio coupled with the additional relay UE;
wherein the remote tactical radio is configured to transmit to and receive from the relay tactical radio on the first channel; wherein the remote tactical radio is configured to transmit to and receive from the additional relay tactical radio on the second channel.

8. The system of claim 1, further comprising at least one intermediate tactical radio configured to communicate with the remote tactical radio and the relay tactical radio.

9. The system of claim 1, wherein the first connectivity interface and the second connectivity interface includes at least one of an Ethernet or a USB connection.

10. The system of claim 1, wherein the remote tactical radio includes a proximity service application, wherein the proximity service application is configured to determine a connectivity metric, wherein the connectivity metric includes a cellular connectivity status of a plurality of UEs and tactical waveform status of a plurality of tactical radios, wherein the remote tactical radio is configured to select the relay tactical radio and the relay UE based on the connectivity metric, wherein the connectivity metric indicates the relay UE has a direct cellular connectivity to the base station.

11. The system of claim 1, wherein the information comprises a PC5 message.

12. A method for transmitting information comprising:
checking for and determining, by a remote User Equipment (UE), a direct cellular connectivity between the remote UE and a base station is denied;
checking for and determining, by the remote UE, a device-to-device (D2D) cellular connection between the remote UE and a relay UE by a PC5 interface is denied in response to determining the direct cellular connectivity between the remote UE and the relay UE is denied; and
establishing a connection between the remote UE and the base station, wherein the connection established between the remote UE and the base station is established in response to determining the D2D cellular connectivity by the PC5 interface between the remote UE and the relay UE is denied, the connection established by:
the remote UE initiating a connection between an application layer of the remote UE and an application layer of a remote tactical radio by a first connectivity interface, wherein the remote UE is physically coupled to the remote tactical radio by the first connectivity interface;
the remote tactical radio initiating a connection between a physical layer of the remote tactical radio and a physical layer of a relay tactical radio by a tactical waveform, wherein the tactical waveform comprises a wireless ad hoc network waveform;
the relay tactical radio initiating a connection between an application layer of the relay tactical radio and the relay UE by a second connectivity interface, wherein the relay UE is physically coupled to the relay tactical radio by the second connectivity interface; and
the relay UE initiating a cellular connection between a physical layer of the relay UE and the base station.

13. The method of claim 12, wherein the connection is further established by at least one of a relay solicitation, a relay response, a direct connection request, a direct security mode command, a direct security mode complete, and a direct communication accept.

14. The method of claim 12, further comprising selecting, by a proximity service application of the remote tactical radio, the relay UE and the relay tactical based on a connectivity metric.

* * * * *